United States Patent [19]

Ikegami et al.

[11] Patent Number: 4,598,284
[45] Date of Patent: Jul. 1, 1986

[54] SYSTEM FOR CHANGING COMMON CARD MODE DATA IN A CARD IMAGE DATA PROCESSING SYSTEM

[75] Inventors: Yoshiki Ikegami, Inagi; Yasuaki Sato, Sagamihara, both of Japan

[73] Assignee: Fujitsu Limited, Kawasaki, Japan

[21] Appl. No.: 540,681

[22] Filed: Oct. 11, 1983

[30] Foreign Application Priority Data

Oct. 11, 1982 [JP] Japan ................................ 57-177773

[51] Int. Cl.⁴ ............................................. G09G 1/14
[52] U.S. Cl. ................................... 340/750; 340/734
[58] Field of Search ............... 340/750, 709, 721, 723, 340/734, 735, 747, 748, 724

[56] References Cited

U.S. PATENT DOCUMENTS

| | | | |
|---|---|---|---|
| 3,566,361 | 2/1971 | Lavertu et al. | 340/734 X |
| 3,872,462 | 3/1975 | Lemelson | 340/734 X |
| 4,020,462 | 4/1977 | Morrin, II | 340/734 X |
| 4,240,075 | 12/1980 | Bringol | 340/724 X |
| 4,246,578 | 1/1981 | Kawasaki et al. | 340/724 X |
| 4,291,305 | 9/1981 | Kimura et al. | 340/734 |
| 4,295,135 | 10/1981 | Sukonick | 340/734 |
| 4,314,357 | 2/1982 | Kimura et al. | 340/734 X |
| 4,352,100 | 9/1982 | O'Connell | 340/734 X |

*Primary Examiner*—Gerald L. Brigance
*Assistant Examiner*—Vincent P. Kovalick
*Attorney, Agent, or Firm*—Staas & Halsey

[57] ABSTRACT

A system for changing common card mode data a plurality of card images including: a memory area for old card mode data; a memory area for old card data; a memory area for card mode data; a memory area for card data; and a memory area for the field correspondence between the old and card mode data. In accordance with the content of the corresponding memory area, all or part of the old card data is transmitted from the old card data memory area to the card data memory area.

2 Claims, 19 Drawing Figures

Fig. 2

| CUSTOMER CARD | | YR MO DAY |
|---|---|---|
| CUSTOMER NO. | ⊐⊐⊐⊐⊐⊐ | |

| CUSTOMER'S NAME | . . . . . . . . . . . . . . . . . |
|---|---|
| ADDRESS | . . . . . . . . . . . . . . . . . <br> . . . . . . . . . . . . . . . . . |
| PHONE | . . . . . . . . . . . . . . . . . |
| AGE | ⊐⊐⊐⊐ |
| NAME | . . . . . . . . . . . . . . . . . |

```
ADDRESS: ⌈                              ⌉
NAME    : ⌈                              ⌉
AGE     : ⊔⊔⊔⊔
ANNUAL  : ⊔⊔⊔⊔⊔⊔⊔⊔
INCOME
```
31

```
ADDRESS: ⌈· · · · · · · · · · · · · · · · · · · · · · ·
          · · · · · · · · · · · · · · · · · · · · · · ·⌉
NAME    : O 1· · · · · · · · · · · · · · · · · · · · ⌉
AGE     : O 2⊔⊔  ANNUAL INCOME ⊔⊔⊔⊔⊔⊔
OCCUPATION: ⌈· · · · · · · · · · ⌉
═══════════════════════════════════════════════
ADDRESS: O O · · · · · · · · · · · · · · · · · · · ⌉
NAME    : O 1· · · · · · · · · · · · · · · · · · · · ⌉
AGE     : O 2⊔⊔
ANNUAL  : O 3⊔⊔⊔⊔
INCOME
```
~31a

~31b

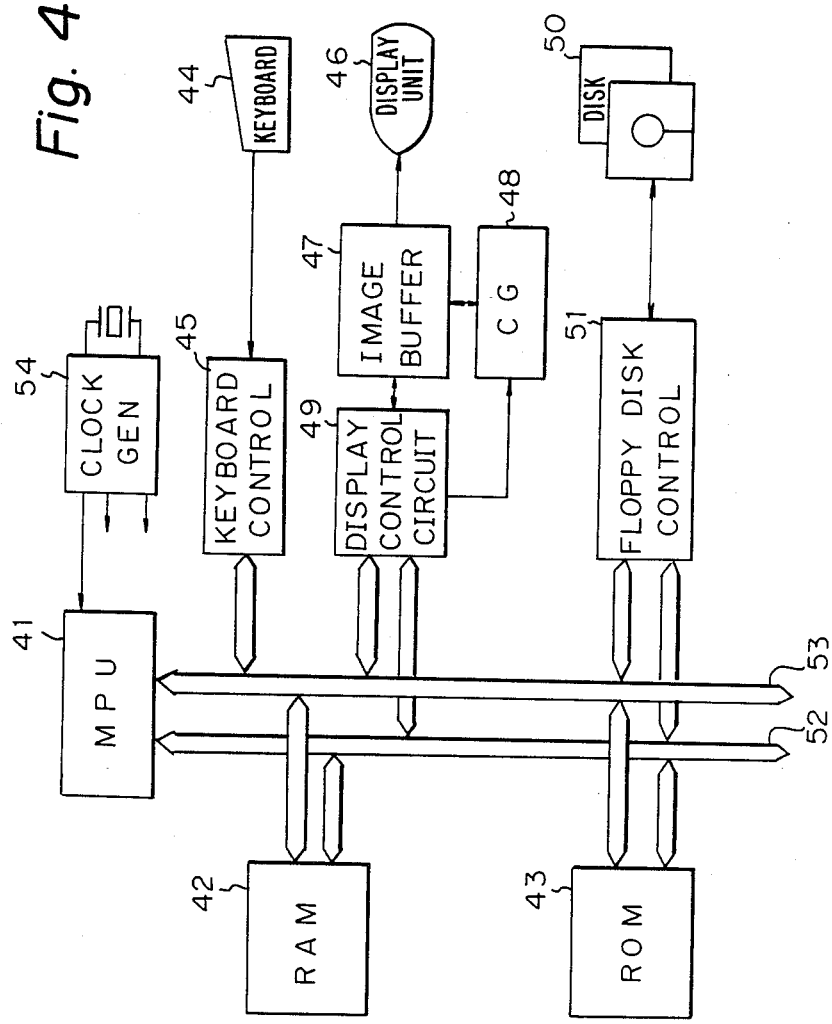

| | OLD FIELD | FRESH FIELD |
|---|---|---|
| ENTRY 1 | 0 0 | 0 0 |
| 2 | 0 1 | |
| 3 | 0 2 | |
| 4 | 0 3 | |

| | OLD FIELD | FRESH FIELD |
|---|---|---|
| ENTRY 1 | 0 0 | 0 0 |
| 2 | 0 1 | 0 1 |
| 3 | 0 2 | 0 2 |
| 4 | 0 3 | |

Fig. 13C

|  | OLD FIELD | FRESH FIELD |
|---|---|---|
| ENTRY 1 | 0 0 | |
| 2 | 0 1 | 0 1 |
| 3 | 0 2 | 0 2 |
| 4 | 0 3 | |

427

SYSTEM FOR CHANGING COMMON CARD MODE DATA IN A CARD IMAGE DATA PROCESSING SYSTEM

BACKGROUND OF THE INVENTION

1. Field of the Invention

The present invention relates to a card image data processing system in which a plurality of cards, i.e., card images, share common card mode data. More particularly, it relates to a system for changing common card mode data for a plurality of card images.

2. Description of the Prior Art

In usual offices, office workers store information in physical card systems. That is, they write the information on to cards and store the cards in filing boxes.

The development of word processing, however, has made possible electronic card systems wherein information is stored on card images in a floppy disk or other memory medium, thereby enhancing office efficiency. In such a system, a card image is displayed on a display unit and information is added thereto.

A card image is comprised of common card mode data for a plurality of card images, such card images with common card mode data being considered a "box", and individual card data for each card image. When adding new form items (fields) or changing a field, thus changing the card mode data, it is necessary for an office worker to reinput all old, individual card data for the new card mode data so as to create new card images. This considerably increases work and may result in errors in the card data due to reinput of the card date.

SUMMARY OF THE INVENTION

It is an object of the present invention to provide a system for easily changing common card mode data for a plurality of card images in a box, in which system the generation of errors in the individual card data can be prevented.

According to the present invention, all or part of the individual card data for an old card mode is automatically transferred as card data for a new or fresh card mode to the memory area thereof in accordance with a table of field correspondence between the old and fresh card modes.

BRIEF DESCRIPTION OF THE DRAWINGS

The present invention will be more clearly understood from the description as set forth below with reference to the accompanying drawings, wherein:

FIG. 2 is an example of a card image according to the present invention;

FIGS. 3A and 3B are display pictures for explaining the principle of the present invention;

FIG. 4 is a block diagram of the card image data processing system according to the present invention;

FIGS. 13A through 13C are examples of the content of a field correspondence table area of FIG. 4;

DESCRIPTION OF THE PREFERRED EMBODIMENT

Figure 1:
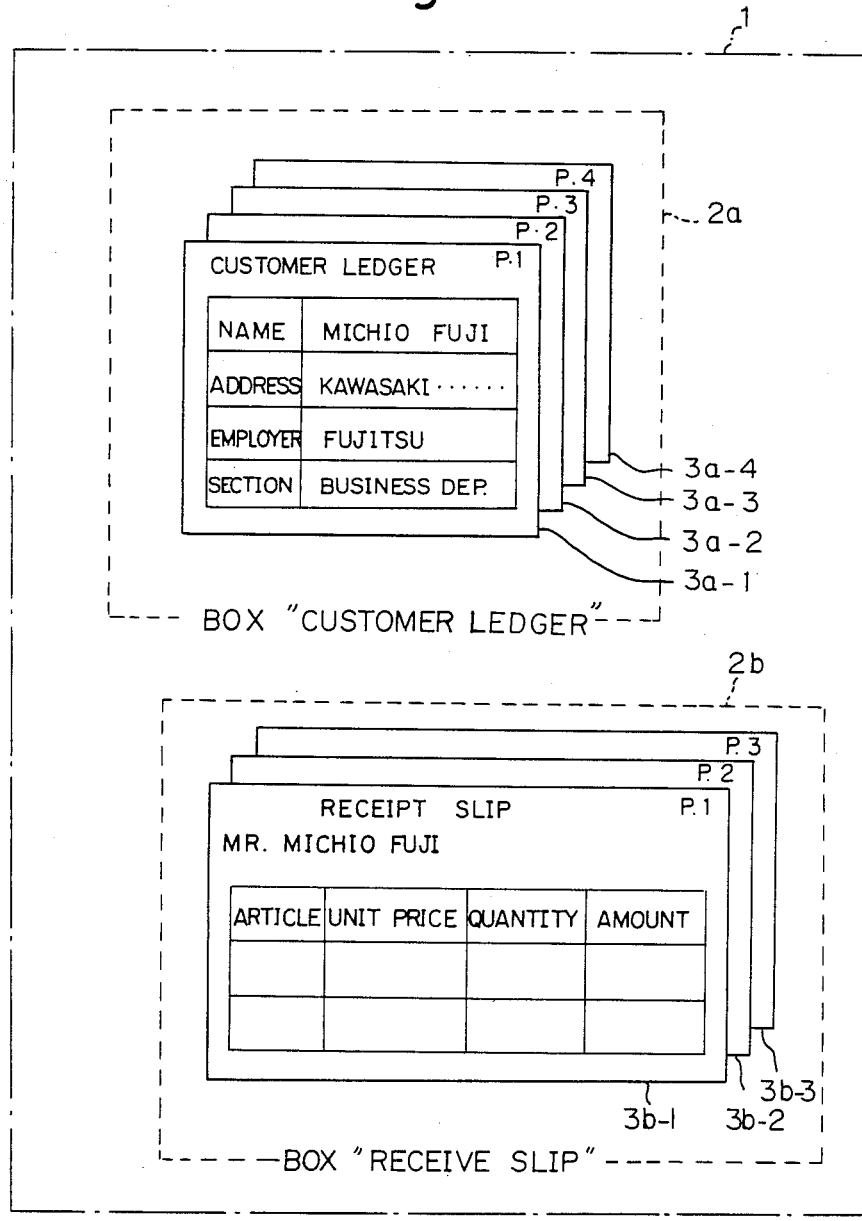
FIG. 1 shows examples of boxes according to the present invention.

In FIG. 1, which illustrates examples of boxes according to the present invention, reference numeral 1 designates a memory medium, such as a floppy disk, for storing a plurality of boxes such as 2a and 2b. Ten boxes, for example, can be accommodated in the floppy disk 1. Each box contains a large number of card images 3a-1, 3a-2, ..., or 3b-1, 3b-2, ..., for example, 3,000 card images. Such card images are displayed on a display unit. Retrieval operations, sort operations, statistical operations, and the like are performed upon the card data corresponding to the card image displayed on the display unit.

As illustrated in FIG. 2, each card image is comprised of common card mode data (blank form data) for all the card images belonging to a box and individual card data (field data). The common card mode data is comprised of, for example, a title "CUSTOMER CARD", field names "CUSTOMER NO.", "CUSTOMER'S NAME", "ADDRESS", "PHONE", "AGE", "NAME", lines 21, and the like, while the individual card data is inserted in the places indicated by marks ". . ." and "⊔⊔⊔⊔".

Note that the common card mode data is stored once for all the card images in one memory area, and that the plurality of individual card data, to which page numbers are given, is stored in separate memory areas so as to save memory space. When displaying a card image on the display unit, the common card mode data and the selected individual card data are merged.

In FIGS. 3A and 3B, which illustrate the principle of the present invention, reference numeral 31 designates a display picture. The display picture 31 of FIG. 3A shows an old card mode, while the display picture of FIG. 3B shows a fresh card mode and the old card mode in the upper and lower regions 31a and 31b ("windows" 31a and 31b), respectively.

In making a fresh card mode, the old card mode is displayed as display picture 31 of FIG. 3A. In this state, the worker adds, changes, or deletes field names and/or field indicating marks such as "⌈", "⌋", and "⊔⊔⊔". After this, the fresh card mode and the old card mode are simultaneously displayed on the upper and lower windows 31a and 31b, respectively, as illustrated in FIG. 3B.

In the old card mode of the window 31b, serial numbers 00, 01, 02, and 03 are given to the fields. The same serial numbers are given to any corresponding fields in the fresh card mode of the window 31a. Fields in the fresh card mode which differ from the old card mode are not given serial numbers. Note that separate serial numbers may be given to new fields of the fresh card mode by a worker. For example, a serial number "04" may be given to the field "OCCUPATION" of the fresh card mode.

Fields of the old card mode not having serial numbers in the fresh card mode are deleted. Then, all or part of the individual card data of fields with corresponding fields in the fresh card mode of the old card mode is transferred to the fields of the fresh card mode.

In FIG. 4, which illustrates a card image data processing system according to the present invention, reference numeral 41 designates a microprocessor unit (MPU); 42 a RAM for storing temporary data; 43 a read-only memory (ROM) for storing programs, constants and, the like; 44 a keyboard; 45 a keyboard control circuit; 46 a display unit (36 rows×48 columns); 47 an image buffer for storing the content of the display unit 46; 48 a character generator; 49 a dispaly control circuit; 50 floppy disks; 51 a floppy disk control circuit; 52 an address bus; 53 a data bus; and 54 a clock generator for supplying clock signals to the MPU 41 and the like.

Figure 5:
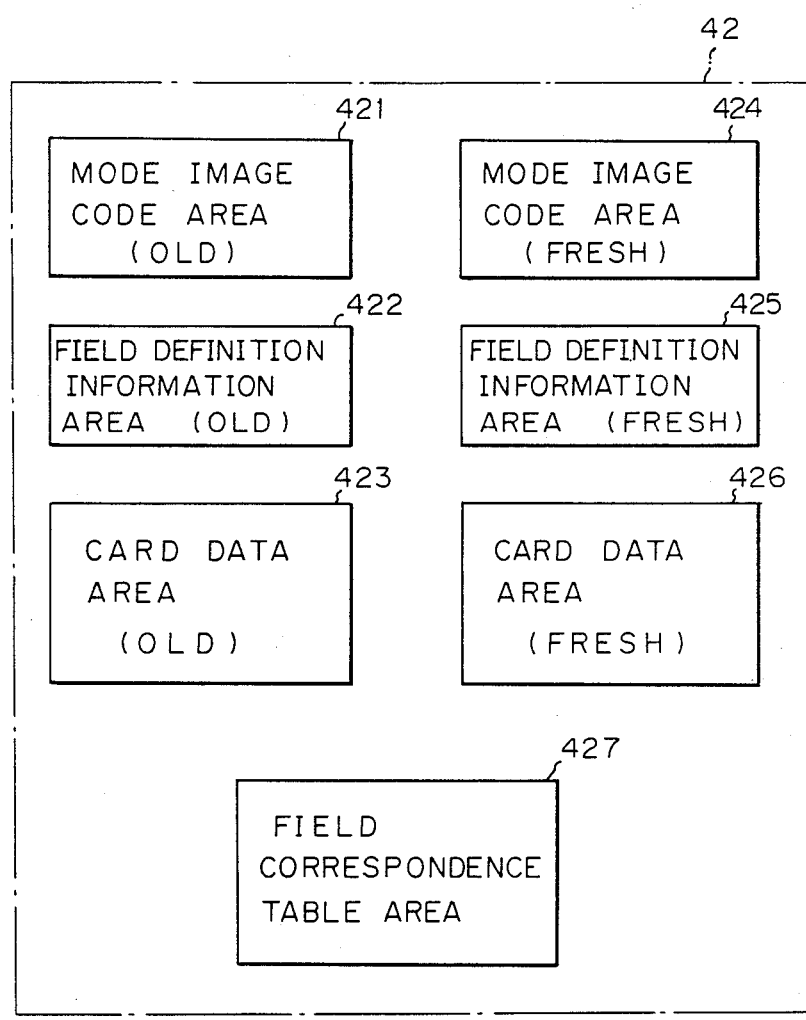
FIG. 5 is a detailed block diagram of the random access memory (RAM) of FIG. 4.

In FIG. 5, which is a detailed block diagram of the RAM 42, seven memory areas 421 through 427 are provided. Reference numeral 421 designates an old mode image code area, 422 an old field definition information area, 42 an old card data area, 424 a fresh mode image code area, 425 a fresh field definition information area, 426 a fresh card data area, and 427 a field correspondence table area between the field definition information areas 422 and 423. The mode image code areas 421 and 424 are used for storing fixed information such as titles, frame lines, and field names. The field definition information areas 422 and 425 are used for storing the location and length of each field. The card data areas 423 and 426 are used for storing individual card data, i.e., variable field data.

The operation of the card image data processing system of FIG. 4 will be explained with reference to FIGS. 6 through 12. First, at step 601, the MPU 41 selects and opens a box which is, in this case, an old box. That is, the MPU 41 loads mode image codes, including box profile information and field definition information from the floppy disks 50, into the mode image code area 421 and the field definition information area 422, respectively, of the RAM 42.

At step 602, the card mode loaded on the areas 421 and 422 is displayed on the display unit 46 (See FIG. 3A).

At step 603, the office worker makes a fresh card mode by using the old card mode displayed on the display unit 46, i.e., adds, changes, or deletes field definition information, field names, and other mode image codes. Alternatively, he may make a fresh card mode without using the old card mode at all.

At step 604, the MPU 41 opens two windows on the display picture.

At step 605, the fresh card mode is displayed in the upper window, and at step 606 the old card mode is displayed in the lower window (See FIG. 3B).

Then, at step 607, a field correspondence table is made in the field correspondence table area 427, (later explained in more detail).

At step 608, the MPU 41 opens a fresh box. That is, the MPU 41 registers fresh mode image codes including fresh field definition information and fresh field names in the floppy disks 50.

Then, at step 609, the MPU 41 transfers all or part of the individual card data stored in the old card data area 423 to the fresh card data area 426 in accordance with the content of the field correspondence table area 427, (also explained in more detail later). The operation at step 609 is performed upon all individual card data in the old box.

Figure 6:
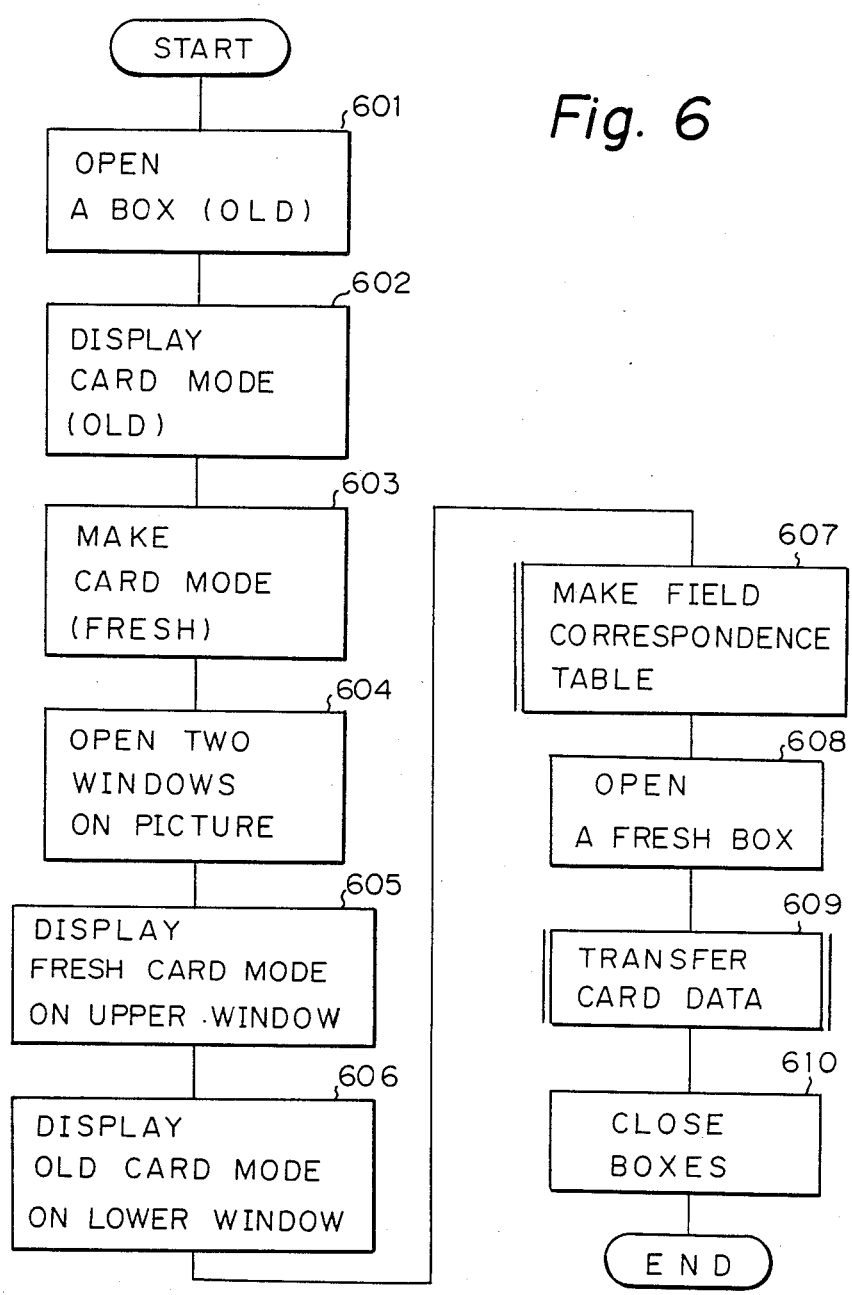
FIGS. 6 through 12 are flow diagrams of the operation of the system of FIG. 4.
Figure 7:
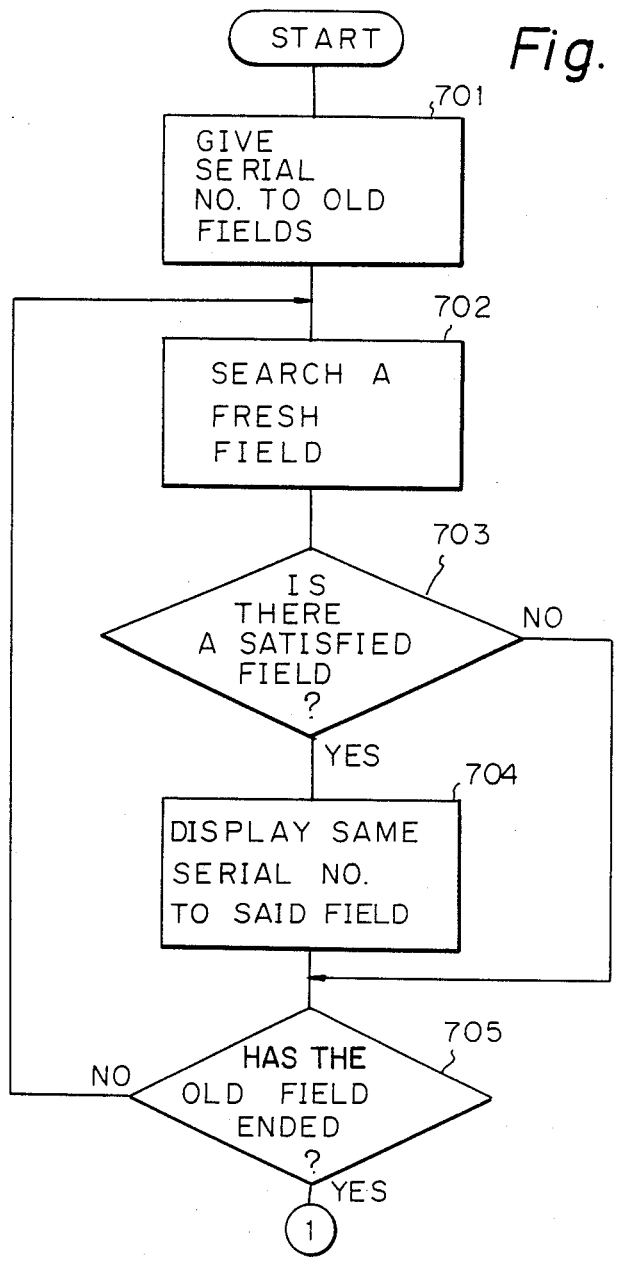

Then, at step 610, the MPU 41 closes both the old and fresh boxes, thereby completing the routine of FIG. 6.

Step 607 of FIG. 6 for making the field correspondence table will now be explained in more detail with reference to FIGS. 7 through 12. First, at step 701, the MPU 41 gives serial numbers such as 00, 01, 02, and 03 to old fields of the old card mode, as shown in FIG. 13A, which mode also corresponds to the lower window 31b of FIG. 3B.

At step 702, the MPU 41 searches for a fresh field which has the same start coordinates of one of the old fields. For example, in FIG. 3B, the "ADDRESS" field of the fresh card mode has the same start coordinates as that of the old card mode. Therefore, in this case, steps 703 and 704, the MPU 41 writes "00" into entry 1, in the field correspondence table, as shown in FIG. 13A. Otherwise, control is transferred to step 705 in which the MPU 41 determines whether or not an old field is ended. Thus, the operations at steps 702, 703 and 704 are performed repeatedly upon all the old fields.

Figure 8:
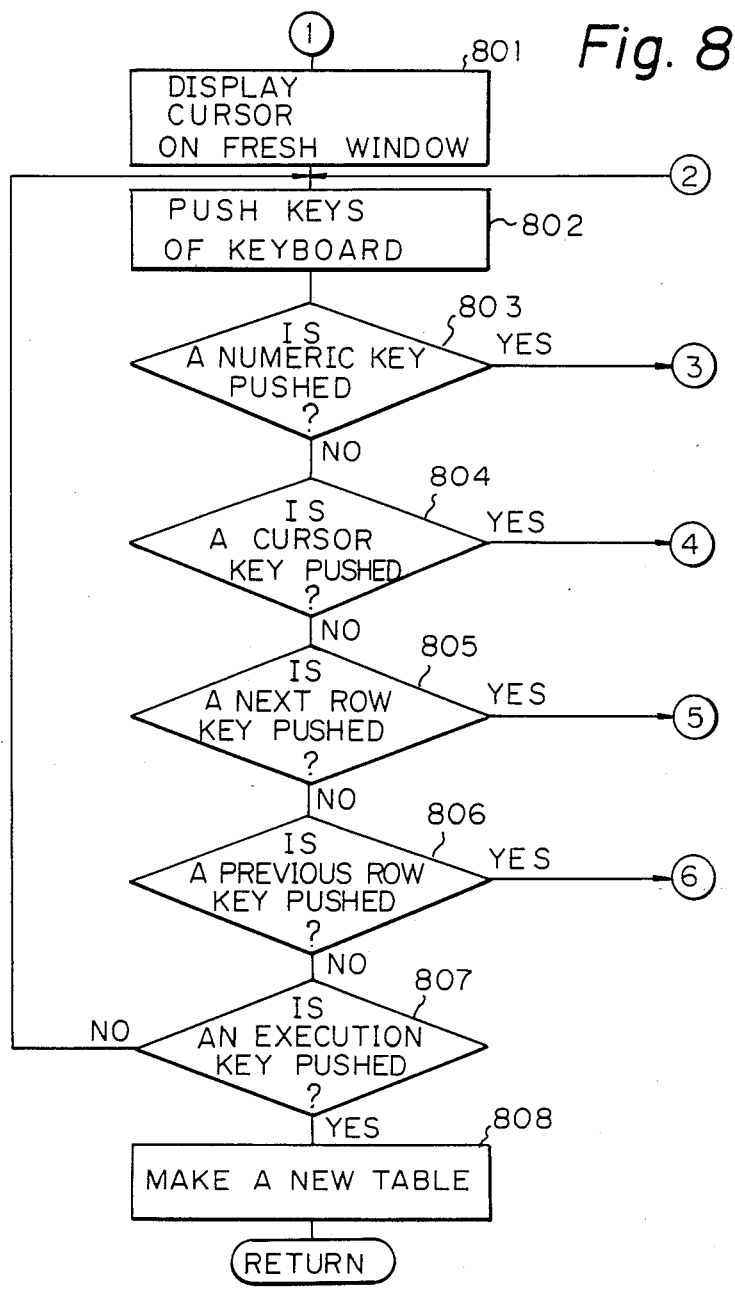
Figure 9:
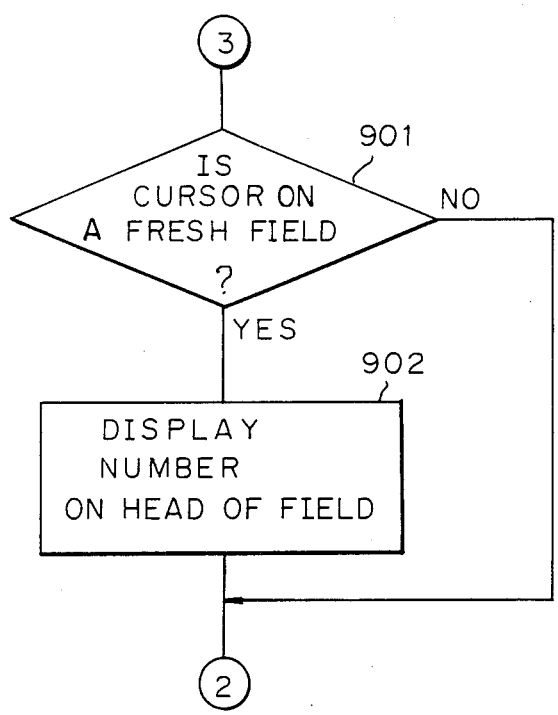
Figure 10:
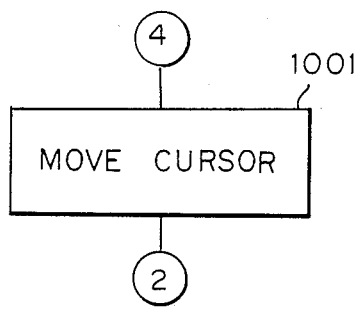
Figure 11:
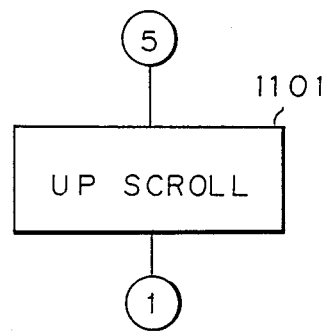
Figure 12:
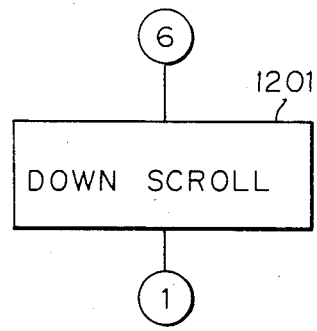

If the determination at step 705 is affirmative, control is transferred to step 801 of FIG. 8. The flow of FIG. 8 shows how the office worker corrects the field correspondence table area 427. At step 801, the office worker moves the cursor to the upper window 31a of FIG. 3B, in which the fresh card mode is displayed. Then, at step 802, a key or keys are pushed. As a result, another operation will be performed in accordance with the pushed keys.

At step 802, the MPU determines whether or not a numeric key or keys are pushed. If pushed, control is transferred to step 901 of FIG. 9, which determines whether or not the cursor is located on a fresh field. If the cursor is located on a fresh field, at step 902, the MPU 41 displays the figures which are intered on the head of this fresh field. For example, as shown in FIG. 13B, "01" and "02" are added to entries 2 and 3 of the fresh fields in the field correspondence table. Note that, in this case, the cursor is controlled so that it can be moved to on any one of the fresh fields. If the determination at step 901 is negative, control returns to step 802 of FIG. 8. Also, control from step 902 returns to step 802 of FIG. 8.

Note that, in this state, the office worker can correct the table. For example, the number "00" of the entry 1 of the fresh fields can be deleted by pushing a deletion key, as illustrated in FIG. 13C, which corresponds to FIG. 3B.

If the determination at step 803 is negative, control is transferred to step 804, in which the MPU 41 determines whether or not the cursor key is pushed. If pushed, control is transferred to step 1001 of FIG. 10, in which the cursor is moved. Thus, control returns to step 802 of FIG. 8.

If the determination at step 804 is negative, control is transferred to step 805, in which the MPU 41 determines whether or not a next row key is pushed. If so, control is transferred to step 1101 of FIG. 11, in which the MPU 41 performs an up-scrolling operation upon the image buffer 47, i.e., the content of the display unit 46. Then, control returns to step 802 of FIG. 8.

If the determination at step 805 is negative, control is transferred to step 806, in which the MPU 41 determines whether or not a previous row key is pushed. If so, control is transferred to step 1201 of FIG. 12, in which the MPU 41 performs a down-scrolling operation upon the image buffer 47, i.e., the content of the display unit 46. Then, control returns to step 802 of FIG. 8.

If the determination at step 806 is negative, control is transferred to step 807, in which the MPU 41 determines whether or not an execution key is pushed. If so, control is transferred to step 808, in which the MPU 41 makes a new field correspondence table. In this table, the MPU 41 gives serial numbers such as 00, 01, 02, 03, and 04 to the entries 1 through 5 of the new fields, respectively, and the MPU 41 gives the numbers 01 and 02 to the entries 2 and 3 of old fields, respectively, in accordance with the table of FIG. 13C. Thus, the routine of FIG. 8, is completed.

Figure 14:
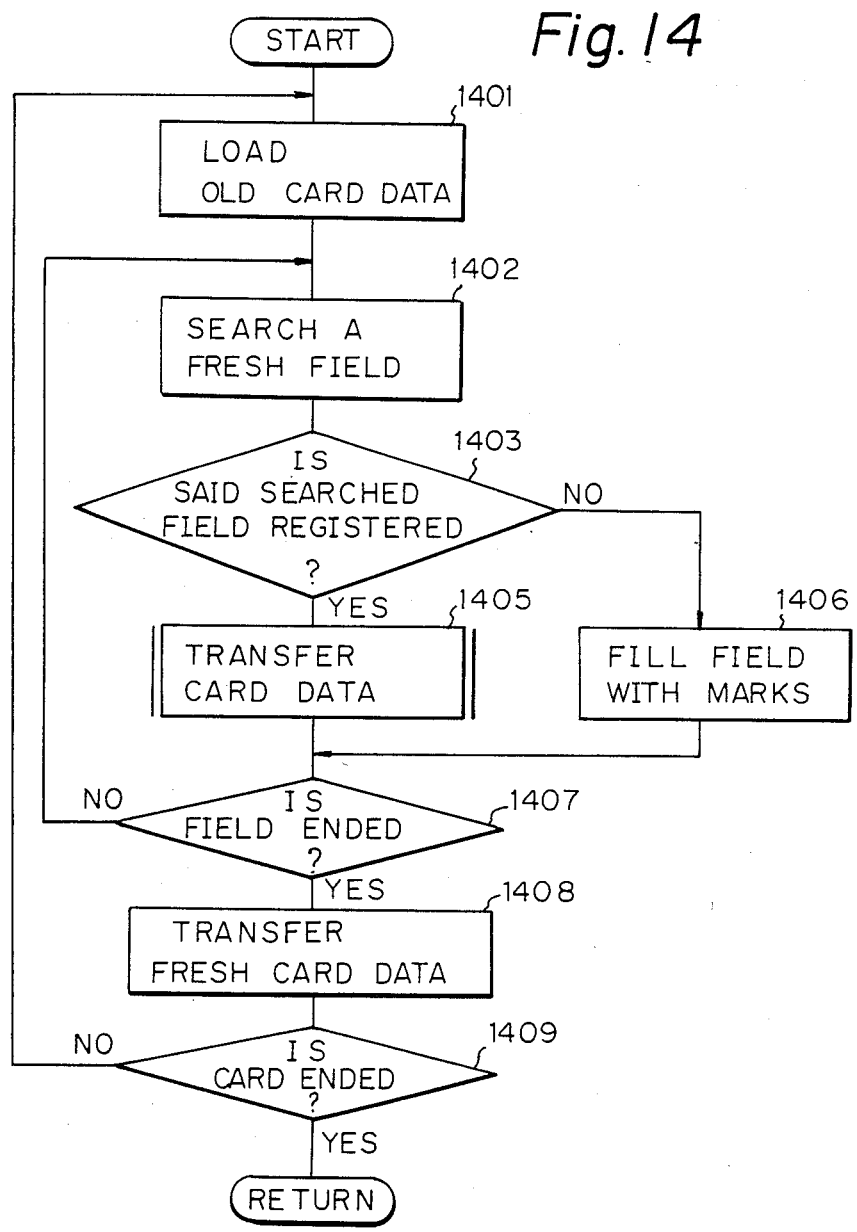
FIG. 14 is a detailed flowchart of a step of FIG. 6.

The card data transferring step 609 of FIG. 6 will be explained in more detail with reference to FIG. 14. At step 1401, the MPU 41 loads a page of card data belonging to an old box from the floppy disks 50 to the old card data area 423 of the RAM 42.

Next, at step 1402, the MPU 41 searches for a fresh field of the fresh mode and, as a result, at step 1403, determines whether or not the searched fresh field is registered in the field correspondence table area 427.

If registered, control is transferred to step 1405, in which the MPU 41 transmits the card data of the corresponding old field of the area 423 to the fresh field of the area 426.

Otherwise, control is transferred to step 1406, in which the MPU 41 fills the searched fresh field with field marks. In this case, if this fresh field is a character field, this field is filled with ". . . ", and if the fresh field is a numeric field, the field is filled with "⊔⊔⊔⊔⊔".

Then, at step 1407, the MPU 41 determines whether or not the searched fresh field is an end field of the fresh card data. If the determination at step 1407 is negative, control returns to step 1402. Therefore, the operation at steps 1402 through 1406 is performed repeatedly upon all the fields of the fresh card data belonging to one page.

Next, control is transferred to step 1408, in which the MPU 41 transfers the fresh card data from the card data area 426 to the floppy disks 50.

At step 1409, the MPU 41 determines whether or not all the cards (pages) belonging to the old box are processed. If the determination at step 1409 is negative, control returns to step 1401 so as to repeat the above-mentioned steps 1402 through 1408. If the determination at step 1409 is affirmative, this routine is completed.

Figure 15A:
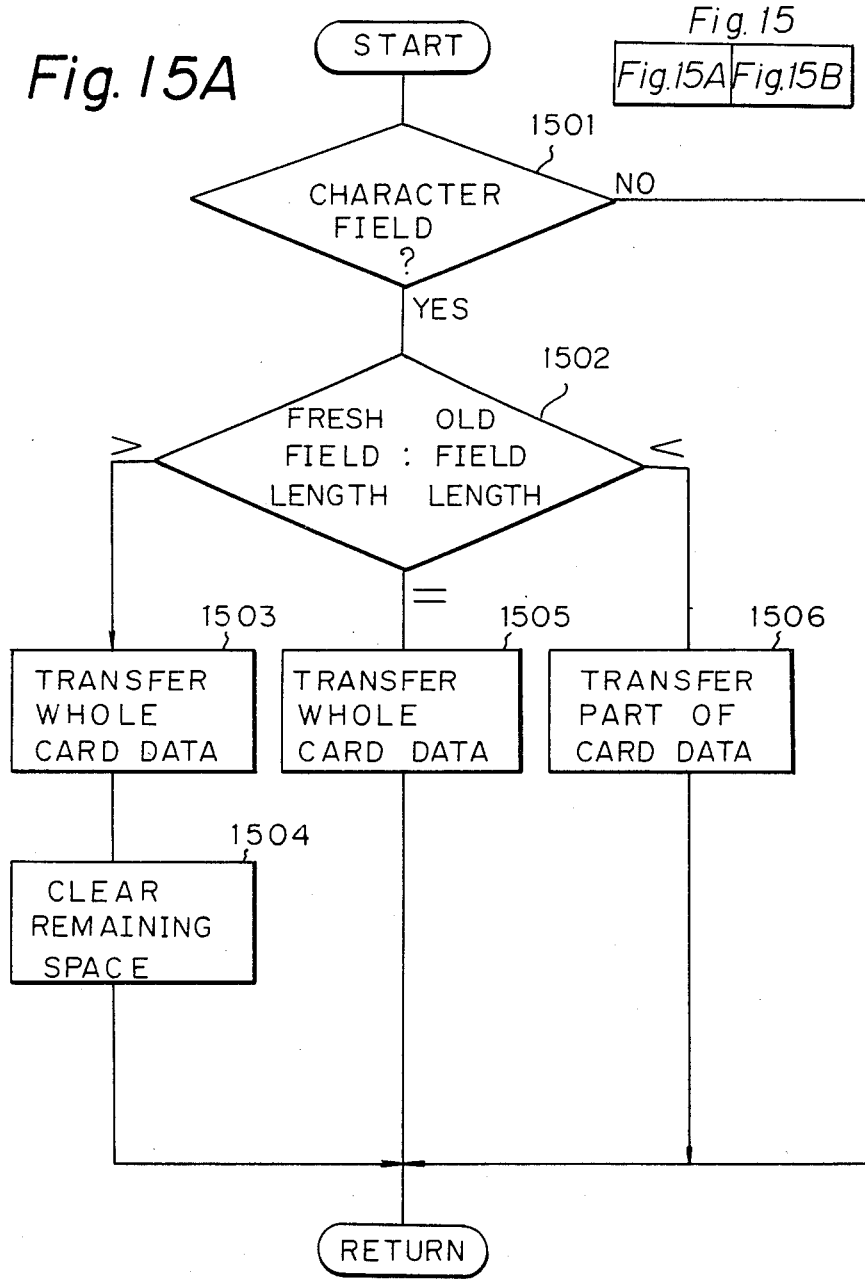
FIGS. 15A and 15B are detailed flowchart of a step of FIG. 14.
Figure 15B:
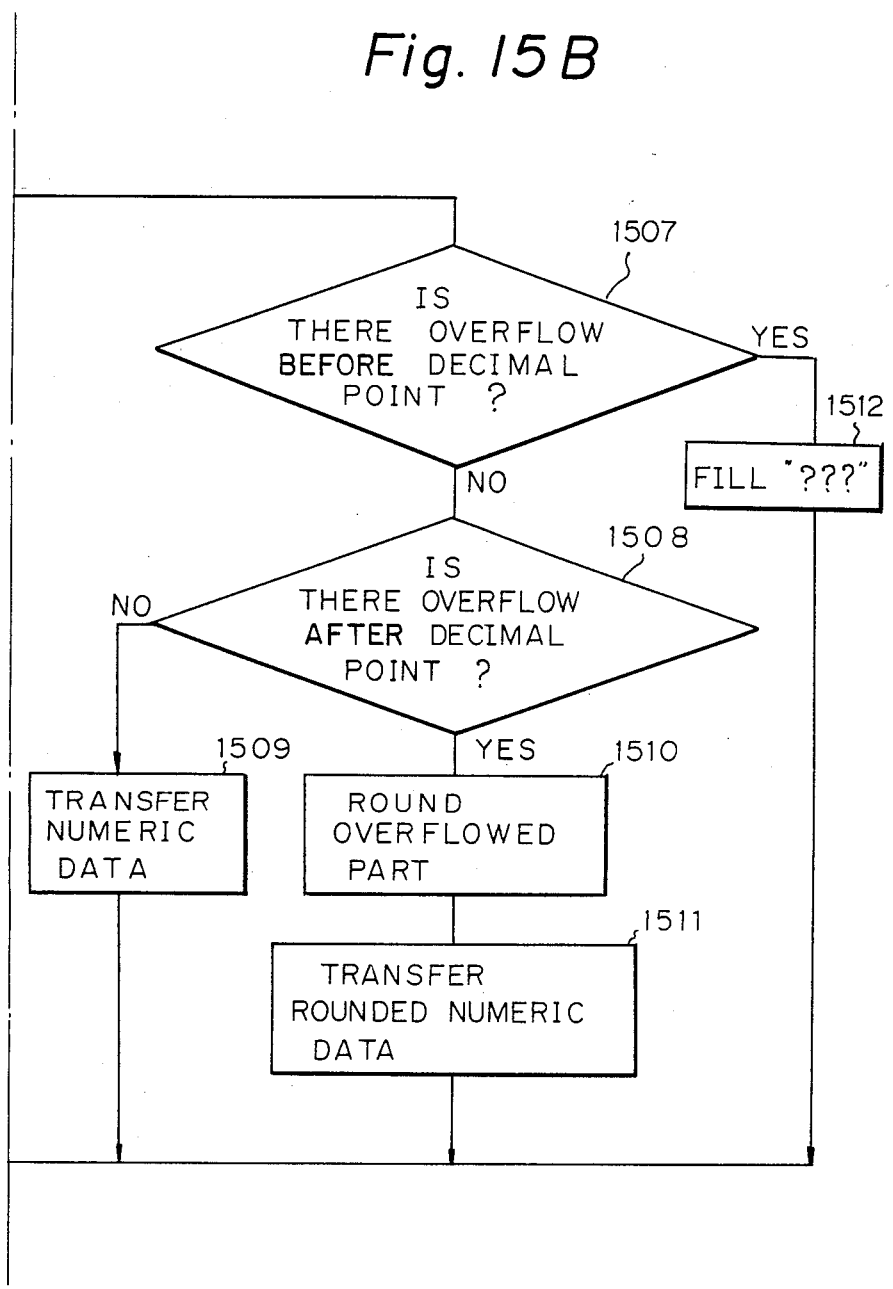

The card data transferring step 1405 of FIG. 14 will be explained in more detail with reference to FIG. 15. At step 1501, the MPU 41 determines whether the searched fresh field is a character field or a numeric field.

If the searched fresh field is a character field, control is transferred to step 1502. At step 1502, the MPU 41 compares the fresh field length with the corresponding old field length.

If the fresh field length is greater than the old field length, control is transferred to step 1503, in which the MPU 41 transfers all the card data of the old field to the left side within the fresh field.

Then, at step 1504, the MPU 41 clears the remaining space of the fresh field.

At step 1502, if the fresh field length is equal to the corresponding old field length, control is transferred to step 1505, in which the MPU 41 transfers all the card data of the old field to the fresh field.

At step 1502, if the fresh field length is less than the corresponding old field length, control is transferred to step 1506, in which the MPU 41 transmits the head part of the card data of the old field, which has the same length as the fresh field, to the fresh field.

At step 1501, if the searched fresh field is a numeric field, control is transferred to step 1507. At step 1507, the MPU 41 determines whether or not there is overflow before the decimal point. At step 1508, the MPU 41 determines whether there is an overflow after the decimal point.

If there is no overflow before or after the decimal point, control is transferred to step 1509, in which the MPU 41 transfers the numeric card data from the old field to the fresh field. In this case, if the old field is associated with commas or a decimal point, such commas or decimal point are also transferred to the fresh field.

If there is an overflow after the decimal point, control is transferred to step 1510, in which the MPU 41 rounds out the overflowed part of the card data (numeric data). At step 1511, the MPU 41 transfers the rounded out numeric data to the fresh field. Also, in this case, if the old field is associated with commas or a decimal point, such commas or decimal point are also transferred to the fresh field.

If there is an overflow before the decimal point, control is transferred to step 1512, in which the MPU 41 fills the fresh field with "???", which indicates that it is impossible to transmit meaningful numeric data from the old field to the fresh field.

As explained above, the operator can easily change a card mode by using a table of field correspondence between an old card mode and a fresh card mode.

We claim:

1. A system for changing common card mode data, where the common card mode includes a mode image and field definition information, for a plurality of card images, the system comprising:

a display unit;
means for inputting information;
memory means comprising:
   a first memory section for storing card mode data belonging to a first card mode,
   a second memory section for storing card data belonging to said first card mode,
   a third memory section for storing card mode data belonging to a second card mode,
   a fourth memory section for storing card data belonging to said second card mode, and
   a fifth memory section, operatively connected to said display unit and said first and third memory sections, for storing data representing a correspondence between the field definition information of said first card mode data and said second card mode data;
means, operatively connected to said display unit and said memory means, for showing said correspondence between the field definition information by displaying said first card mode data, stored in said memory means, and said second card mode data, stored in said memory means, on said display unit; and
means, operatively connected to said memory means, for transferring all or part of said first card data stored in said second memory section of said memory means to said fourth memory section of said memory means in accordance with the data representing a correspondence between the field definition information stored in said memory means.

2. A system as set forth in claim 1, further comprising means for making said second card mode data, including:

means, operatively connected to said display unit and said memory means, for displaying said first card mode data on said display unit; and
means for changing said first card mode data displayed on said display unit to said second card mode data.

* * * * *

UNITED STATES PATENT AND TRADEMARK OFFICE
CERTIFICATE OF CORRECTION

PATENT NO. : 4,598,284

DATED : July 1, 1986

INVENTOR(S) : Ikegami et al.

It is certified that error appears in the above-identified patent and that said Letters Patent is hereby corrected as shown below:

Col. 2, line 9, "2aand" should be --2a and--;
      line 28, "once" should be --once,--;
      line 29, "images" should be --images,--.

Col. 3, line 5, "dispaly" should be --display--;
      line 49, "427," should be --427--;
      line 58, "427," should be --427--.

Col. 4, line 7, before "steps" insert --at--;
      line 8, change "1," to --1 of the fresh fields,--;
      line 28, "intered" should be --entered--;
      line 33, delete "on".

Col. 5, line 22, change ""..."" to --"......"--.
      line 23, "⊔ ⊔ ⊔ ⊔ ⊔" should be -- ⊔ ⊔ ⊔ ⊔ ⊔ ⊔ --

Signed and Sealed this

Twenty-third Day of September 1986

[SEAL]

Attest:

DONALD J. QUIGG

Attesting Officer

Commissioner of Patents and Trademarks